United States Patent

[11] 3,623,143

[72] Inventor Joseph F. Marshall
Woburn, Mass.

[21] Appl. No. 258,930
[22] Filed Feb. 15, 1963
[45] Patented Nov. 23, 1971
[73] Assignee The United States of America as represented by the Secretary of the Navy

[54] ANTIJAM RECEIVER OF WIDE DYNAMIC RANGE UTILIZING IAGC ACTION FOR CLOSELY PACKED PULSES
11 Claims, 5 Drawing Figs.

[52] U.S. Cl. .......... 325/326, 325/400, 325/404, 325/408, 325/412, 330/136, 330/141, 343/17.1 R
[51] Int. Cl. .......... H04b 1/16, H03g 3/20
[50] Field of Search .......... 325/400, 404, 408, 412, 414, 326; 343/17.1; 330/171, 136–141

[56] References Cited

UNITED STATES PATENTS 2,120,974 6/1938 Foster .......... 325/114

*Primary Examiner*—Rodney D. Bennett, Jr.
*Assistant Examiner*—Daniel C. Kaufman
*Attorneys*—Q. Baxter Warner and H. H. Losche

CLAIM: 1. An instantaneous automatic gain control circuit of a radio frequency receiver having a plurality of intermediate frequency amplifier stages coupled in sequence by transformers the secondaries of which transformers are center tapped, comprising:

a sampling secondary winding in flux relation with selected intermediately frequency transformers;

a threshold control voltage coupled to one terminal lead of one of the sampling secondary windings to establish a bias in said winding; and a slow back biasing network and an instantaneous back biasing network coupled in parallel between the other terminal lead of said one sampling secondary winding and the center tap of the secondary in flux relation with said one of the sampling secondary windings whereby the intermediate frequency amplifier stages having jamming signals of unwanted high amplitude applied thereto will be instantaneously back biased in the forward direction to avoid saturation of the forward intermediate frequency amplifier stages.

PATENTED NOV 23 1971

3,623,143

INVENTOR.
Joseph F. Marshall,
BY
H. H. Locke
Attys.

ANTIJAM RECEIVER OF WIDE DYNAMIC RANGE UTILIZING IAGC ACTION FOR CLOSELY PACKED PULSES

This invention relates to instantaneous automatic gain control circuits for radio frequency receivers and more particularly to instantaneous automatic gain control loops constructed and arranged to receive intermediate frequency signals from the intermediate frequency-coupling transformers between stages of intermediate frequency amplifiers to instantaneously back bias corresponding subsequent intermediate frequency amplifiers.

Without protective circuitry radio frequency (RF) receivers may have the intermediate frequency (IF) amplifiers thereof saturated with clutter signals or high-amplitude-jamming signals conducted as video signals through the receiver. In RF receivers having protective gain control circuits, the IF amplifiers will acquire a bias voltage that increases until the video voltage at the second detector is reduced to some equilibrium value. This is accomplished in prior known devices by automatic gain control (AGC) or instantaneous automatic gain control (IAGC) circuits which usually operate from the video voltage signals taken from the second detector with a feedback through the AGC or IAGC circuit to one of the preceding IF amplifiers. This equilibrium value is such that it equals the bias voltage on the IF amplifier needed to reduce the gain of the latter to a point where the incoming signal or clutter voltage produces the indicated output equilibrium voltage. In circuits of this type the tightness of control is usually insufficient to prevent video saturation of the IF amplifiers. The tightness of control as used herein is the ratio of the output amplitude change to the input amplitude change. The effectiveness of these IAGC circuits could be increased by increasing the number of IAGC loops; however, the increase of the IAGC loops often cause instability of the IF amplifier stages. Also, prior known IAGC circuits were not sufficiently fast to cope with jamming signals which produce instantaneous high amplitude, short pulse signals which saturated the IF stages.

In the present invention IAGC loops are provided to effect or introduce, at a 0- to 5-megacycle (mc.) rate, back bias gain control for maintaining effectively desired high incremental small signal gain for pulses of short duration in the 1 to 2.7-microsecond range while reducing gain for unwanted continuous wave (CW), highly repetitive pulses of long and short duration by the application of large back bias signals at a zero to video rate. In this invention each IAGC loop consists of a back biasing network including a selective filter containing a high frequency threshold control and a 0 to 5 mc. direct current DC amplifier that amplifies directly desired back bias to the grids of a push-pull IF amplifier stage through a center tap in the winding of the coupling IF transformer. The high frequency threshold control eliminates grid current saturation due to high-amplitude short-pulse signals by effecting IAGC action above and beyond gain value, thus reducing pulse stretching of desired signals as well as preventing blanking due to slow recovery of the IF amplifier grid overdrive. The virtual complete cancellation, of what normally would have been paralyzing voltages to the grids of a subsequent IF amplifier stage, is assured through the use of the back bias control voltage frequencies in the output of the preceding IF amplifier stage and the in-phase feeding of back bias through the center tap winding of the IF transformer input to the next push-pull balanced amplifier stage. It is accordingly a general object of this invention to provide an IAGC loop that is adapted to be duplicated and coupled to as many of the IF coupling transformers as desired which will instantaneously effect back bias of those IF amplifier stages to eliminate short pulse, high amplitude clutter and jamming video signal information to enable the RF receiver to continue detection of video signals during the reception of CW jamming or clutter signals.

These and other objects and the attendant advantages, features, and uses may become more apparent to those skilled in the art when considered along with the accompanying drawing in which.

Figure 1:
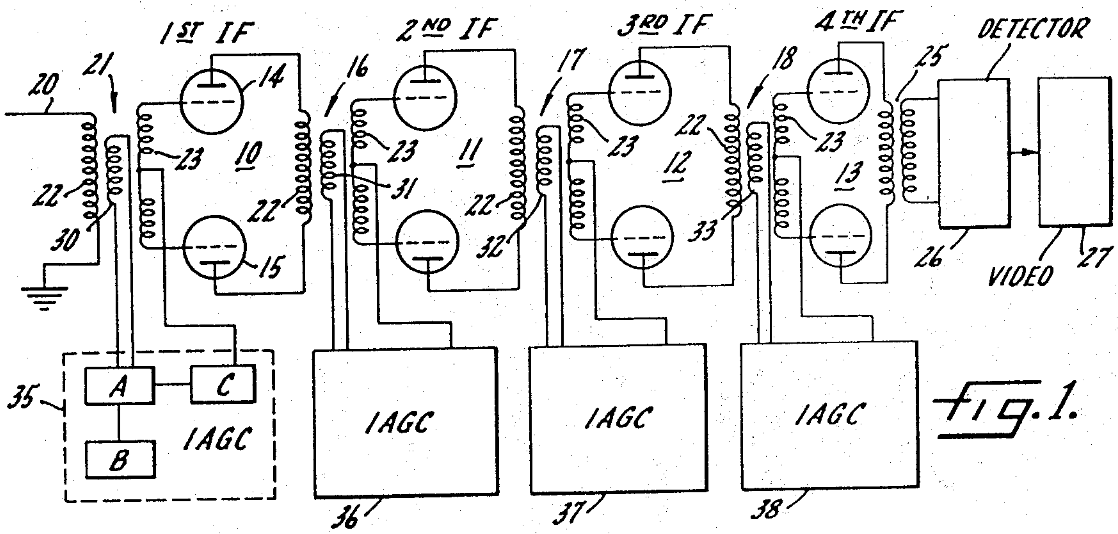
FIG. 1 illustrates, partially in block diagram and partially in circuit schematic, the coupling arrangement of the IAGC circuits with the several stages of an IF strip in a radio frequency receiver.

Referring more particularly to FIG. 1, four IF Stages 10, 11, 12, and 13 are shown as each having a pair of triodes, or double triode tube sections, 14 and 15 providing balanced push-pull, sharp cutoff, amplifier stages. Each IF amplifier is coupled through a transformer 16, 17, or 18, the first IF stage 10 being coupled from an input signal conductor 20 through the input transformer 21. The input conductor 20 is through the primary 22 of the transformer 21, the secondary 23 of which is center-tapped and the end leads are connected, respectively, to the control grids of the balanced push-pull IF amplifier tubes 14 and 15. The primary and secondary windings of coupling transformers 16, 17, and 18 are identical to 22 and 23 of coupling transformer 21 and accordingly, these primary and secondary windings have the same reference characters. The output of the last IF amplifier stage 13 is through an output transformer 25 to the second detector 26, the output of which is to the video circuits 27 of the RF receiver. The balanced push-pull IF amplifier stages described herein are of conventional type and are described in detail only for the purpose of providing the environment for the invention herein.

In accordance with the invention herein, each IF amplifier coupling transformer 21, 16, 17, and 18 has a sampling secondary winding 30, 31, 32, and 33 in flux relation with the corresponding primaries 22 of these transformers. Each sampling secondary winding is coupled to a back bias selective filter represented in block A of FIG. 1 which has coupled thereto a high-frequency threshold control illustrated in block B in FIG. 1. Block A is coupled to block C which designates a DC amplifier operative in a zero to 5 mc. range, the output of which is coupled to the center tap of the secondary winding 23 in the coupling transformer 21. The IAGC networks 36, 37, and 38, are coupled in like manner to the sampling secondary windings 31, 32, and 33, respectively, to provide back bias control to the IF amplifiers 11, 12, and 13. While FIG. 1 illustrates an IAGC back biasing control loop connected to each of the IF amplifier stages 10, 11, 12, and 13, it is to be understood that one or more of these IAGC back biasing loops may be used as desired to control the clutter and jamming signals in the IF strip.

Figure 2:
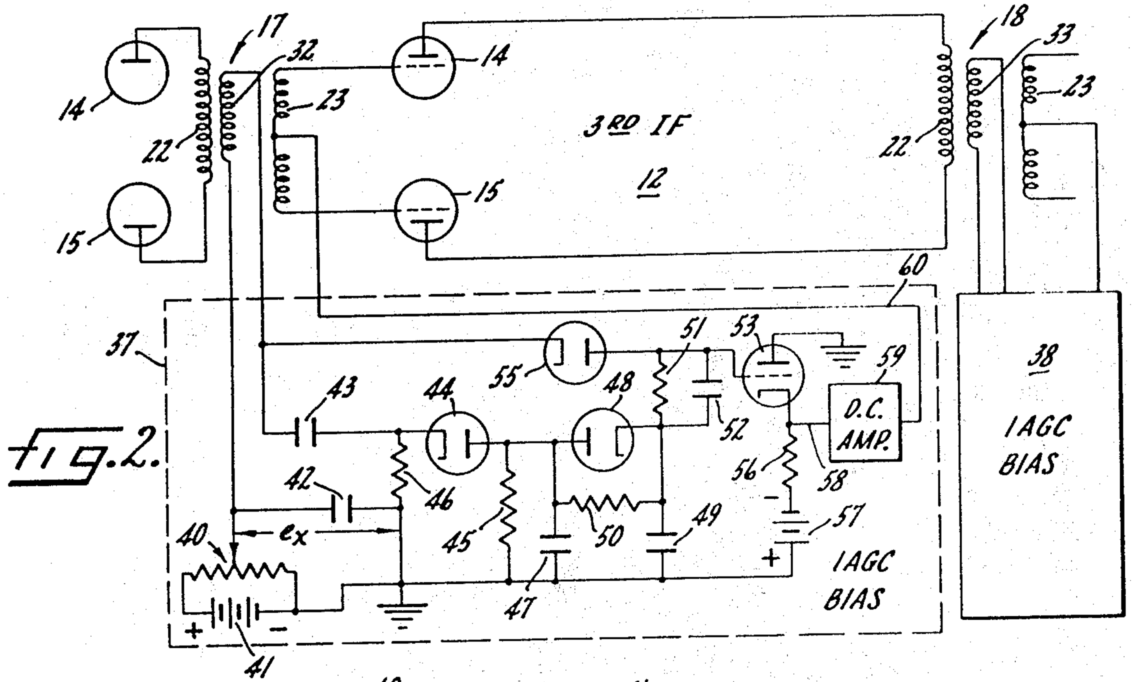
FIG. 2 illustrates, partially in block and partially in circuit schematic, an IAGC circuit in its environmental coupling with an IF amplifier.

Referring more particularly to FIG. 2, the third IF amplifier 12 is shown in greater detail to illustrate the circuit schematic of the IAGC control circuit 37 incorporated therewith. It is to be understood that any one of the IF amplifier circuits of FIG. 1 could have been illustrated along with its associated IAGC control circuits since all of the IF amplifier and IAGC circuits of FIG. 1 are identical. The bias responsive secondary winding 32 in the coupling transformer 17 of the IF amplifiers 11 and 12 has one lead connected to the adjustable tap of a potentiometer 40, the ends of which are connected across a DC voltage source 41, illustrated herein as being a battery. The negative terminal of the DC voltage source 41 is directly coupled to a fixed potential, herein referred to as ground, and the adjustable tap of the potentiometer 40 is shunted to ground through a capacitor 42 establishing a threshold DC biasing voltage $e_x$ in the secondary 32. The other lead of the secondary winding 32 is coupled through a capacitor 43 to the cathode of a diode 44, the anode of which is loaded through a resistor 45 to ground potential and the cathode of which is biased through a resistor 46 to ground potential. The anode resistor 45 is paralleled by the capacitor 47, the anode of the diode 44 being in back-to-back anode relation with a diode 48 having the cathode of the latter coupled through a capacitor 49 to ground potential. The diode 48 has a resistance 50 coupled in parallel therewith, and the cathode of diode 48 is coupled through a parallel network of a resistor 51 and a capacitor 52 to the grid of a cathode follower tube 53. In parallel with the circuit 43 through 52, above described, is a diode 55 having its cathode directly coupled to the same lead of the secondary winding 32 as the capacitor 43 and having its anode coupled directly to the grid of the cathode follower tube 53. The cathode of the cathode follower tube 53 is coupled through a cathode load resistor 56 to a DC voltage source 57 herein illustrated as a battery, the negative pole of which is coupled to the cathode of cathode follower tube 53 through the cathode resistor 56 and the positive pole of which is coupled directly to ground. The cathode output of the cathode follower tube 53 is connected by way of conductor means 58 to a DC amplifier 59, the output of which is connected through the conductor means 60 to the center tap of secondary 23 in the IF transformer 17. The circuit 43 through 58 constitutes the back bias selective filter circuit A as shown in FIG. 1, the potentiometer 40 and its DC voltage source 41 constitute the high-frequency threshold control as illustrated in block B of FIG. 1, and the DC amplifier 59 is the block C of FIG. 1. The elements 44, 45, 47 and 48, 49, 50 incorporate the slow back-biasing selective filter circuit for back biasing the IF amplifier 12 and the elements 55, 51, and 52 constitute the fast or instantaneous back-biasing selective filter circuit for instantaneously back biasing the IF amplifier 12. The results of the IAGC circuit 37 shown in FIG. 2 can best be understood by reference to FIGS. 3, 4, and 5.

Figures 3, 4, 5:
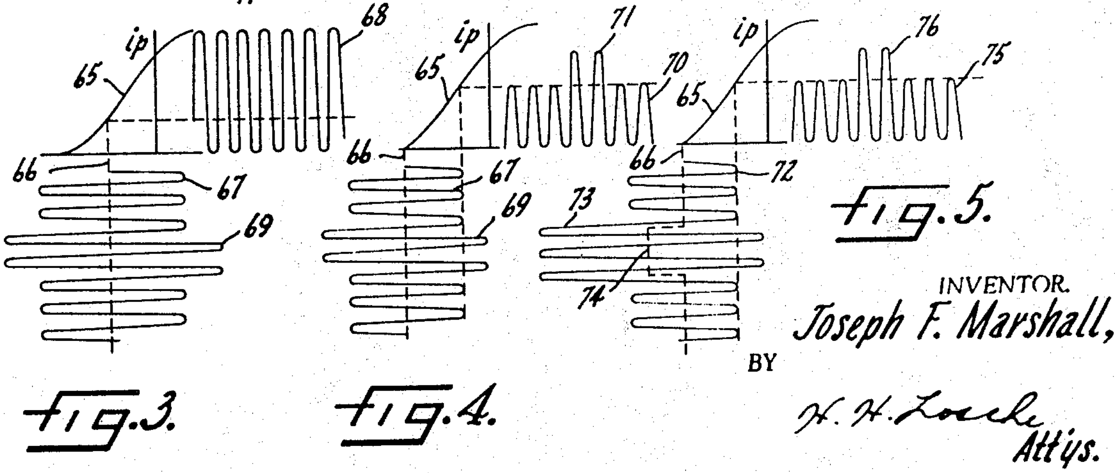
FIG. 3 shows waveforms illustrating a bias on an intermediate frequency of an IF amplifier without automatic control.
FIG. 4 shows waveforms illustrating conventional automatic back biasing for IF amplifiers.
FIG. 5 shows waveforms with special instantaneous back biasing protection against pulse stretching over a large dynamic range for an IF amplifier.

FIG. 3 shows by waveforms the IF waves applied to an IF amplifier which is biased, but not automatically biased. As is well known by those skilled in the art, the curve 65 illustrates the tube characteristics of the IF amplifier tubes and the dashed line 66 illustrates the bias on the IF amplifier on which the input wave 67 is centered. The input wave 67 will produce the output wave 68 which, in the absence of automatic back biasing, produces a clipped wave of constant amplitude. The video signals represented by the peaks 69 in the input wave 67 are entirely lost.

Referring more particularly to FIG. 4, the waveforms represent automatic back biasing for an IF amplifier in which the same input wave 67 with the video intelligence 69 thereon is applied to the IF amplifier to produce the output waveform 70 with the amplified video wave 71 thereon. In this Figure the video portion 69 of the waveform 67 could be of such a high amplitude produced by a jamming radar to cause the output video portion 71 in the waveform 70 to saturate the IF amplifier. Under such conditions the IF amplifiers could not recover readily and the video-pulses would be stretched which is not desirable.

FIG. 5 illustrates waveforms for the input and output of an IF amplifier with the IAGC biasing circuit, as shown in block 37, in operation. In this Figure the input waveform as shown by the wave 72 has a jamming signal portion 73 therein which is instantaneously back biased from the back-biasing voltage illustrated by the dashed line 66 over the dashed line portion 74. This will produce on the output of the IF amplifier the amplified waveform 75 having the video signal 76 therein. The video signal 73 would always be back biased as represented at 74 to avoid the IF amplifiers from being saturated and also the output of the video amplifier stages would indicate the target by the video signal 76.

OPERATION

In the operation of the invention as best illustrated in FIG. 2, signals are applied to the IF strip over the conductor 20 and conducted through the transformers 21, 16, 17, and 18 through the output transformer 25 to the second detector 26 and video circuit 27 as shown in FIG. 1. An IF signal applied on the output of the second IF 11 through the primary 22 of transformer 17 will produce in the sampling secondary 32 a frequency as illustrated by 67 or 72 in FIGS. 4 and 5, respectively. This frequency will be applied to the slow back-biasing circuit 43 through 50 to produce a negative back-biasing voltage on the grid of the cathode follower tube 53 and through DC amplifier 59 to the center tap of the secondary 23 of coupling transformer 17 to reduce the bias on the grids of tubes 14 and 15 in the third IF amplifier 12. As variations occur in the amplitude of the incoming IF signals 67 or 72, the slow back-biasing circuit 43 through 50 will back bias the grids of the IF amplifier tubes 14 and 15 in the third IF amplifier 12 to cause the back bias 66 to come to rest at a point averaging the amplitudes of the input wave 67 or 72 at some equilibrium state. It is to be noted that the cathode of the diode 44 is biased to ground potential through the biasing resistor 46 and the elements 45 and 47 provide an RC network having a filter band in the range of the IF frequency. The resistor 50 and capacitor 49 operate as an integrator circuit to produce a smooth direct current voltage on the cathode of the diode 48 applicable through the resistor 51 to the grid of the cathode follower tube 53. Diode 48 provides for a fast decay time for discharging capacitor 49. This operation of the slow back-biasing circuit 43 through 50 will produce the proper bias on the grids of tubes 14 and 15 of the third IF amplifier 12 to maintain normal amplification of the IF and any video signal information such as 69 in FIG. 4 for the receiver.

Upon the application of a jamming signal received by the RF receiver, this jamming signal will appear in the IF amplifier string by the waveform 73 in FIG. 5. Upon the application of the waveform 72, 73 in the primary 22, being the output of the second IF 11, this IF signal and the jamming signal will be reflected in the sampling secondary 32 by mutual inductance and the jamming signal 73 will be directly applied to the cathode of the diode 55 in the instantaneous AGC network to produce an immediate back bias on the grid of the cathode follower tube 53 more negative than the negative back bias voltage established by the circuit 43 through 50. This instantaneous back-biasing voltage is represented by the dashed line 74 in FIG. 5 which is operative through the cathode follower tube 53 and the DC amplifier 59 over the conductor 60 to the midpoint of the secondary winding 23 of the coupling transformer 17 to produce an instantaneous drop on the grids of tubes 14 and 15 in the third IF amplifier 12. The third IF amplifier stage 12 will then produce an amplified output shown by the curves 75 and 76 in FIG. 5 which prevents the saturation of IF amplifier 12 and subsequent IF amplifiers. While the dashed line 66 and 74 is illustrated in FIG. 5 as following the first oscillation of the jamming signal 73, it is to be understood that there may be some small lapse of time in the operation. For example, the circuit designs shown in FIG. 2 is constructed to be operative from a 0- to 5-megacycle rate at which no more than five cycles 73 could be applied to the grids of the IF amplifier tubes 14 and 15 before the instantaneous back-biasing diode 55 and its related circuitry 51 and 52, together with the effectiveness of the 0 to 5 mc. direct current amplifier 59, could be established. In this manner jamming signals, such as illustrated by 73 on the IF input waveform 72, are rendered ineffective to saturate the IF amplifiers 10 through 13 with the corresponding IAGC circuits, as shown in detail by 37 in FIG. 2, connected as shown in FIG. 1. In order to reduce the high-amplitude video or jamming signals conducted through the IF amplifier stages and to decrease the probability of amplifier saturation, more than one IAGC circuit may be used or, where considered necessary, an IAGC circuit could be used with each IF amplifier stage as shown in FIG. 1. Also, the invention shown and described herein incorporated in a receiver would operate continuously to indicate or track a target although that target is reflecting back jamming signals. This target is represented in the IF waveform 75 by the video portions 76.

While many modifications and changes may be made in the constructional details and features of this invention, a preferred embodiment of which is illustrated in FIGS. 1 and 2, it is to be understood that I desire to be limited only by the scope of the appended claims.

I claim:

1. An instantaneous automatic gain control circuit of a radio frequency receiver having a plurality of intermediate frequency amplifier stages coupled in sequence by transformers the secondaries of which transformers are center tapped, comprising:
   a sampling secondary winding in flux relation with selected intermediate frequency transformers;
   a threshold control voltage coupled to one terminal lead of one of the sampling secondary windings to establish a bias in said winding; and
   a slow back-biasing network and an instantaneous back-biasing network coupled in parallel between the other terminal lead of said one sampling secondary winding and the center tap of the secondary in flux relation with said one of the sampling secondary windings whereby the intermediate frequency amplifier stages having jamming signals of unwanted high amplitude applied thereto will be instantaneously back biased in the forward direction to avoid saturation of the forward intermediate frequency amplifier stages.

2. An instantaneous automatic gain control circuit as set forth in claim 1 wherein said instantaneous back biasing network includes a diode having its cathode directly coupled to said other terminal lead to have the threshold control voltage applied thereto and its anode coupled to the input of said center tap.

3. An instantaneous automatic gain control circuit as set forth in claim 2 wherein said coupling of said slow and instantaneous back-biasing networks to said center tap of the secondary in flux relation with said one of the sampling secondary windings includes a direct current amplifier.

4. An instantaneous automatic gain control circuit of a radio frequency receiver having a plurality of intermediate frequency amplifier stages coupled by transformers the secondaries of which transformers are center tapped, comprising:
   a sampling secondary winding in flux relation with each transformer and coupled across a threshold control voltage;
   a direct current amplifier having an output coupling a secondary center tap of the transformer of one of said intermediate frequency amplifier stages, and having an input;
   an automatic back-biasing network in said coupling of said sampling secondary winding of said one intermediate frequency transformer and said threshold control voltage, said automatic back-biasing network having an output coupled to the input of said direct current amplifier to back bias said one intermediate frequency amplifier;
   and an instantaneous back-biasing network in said coupling of said sampling secondary and said threshold control voltage, said instantaneous back-biasing network having an output coupled to the input of said direct current amplifier to instantaneously back bias said one intermediate frequency amplifier whereby said plurality of intermediate frequency amplifiers will not oversaturate from instantaneous voltage amplitude signal changes amplified thereby.

5. An instantaneous automatic gain control circuit as set forth in claim 4 wherein said instantaneous back biasing network includes a diode having its cathode coupled to said sampling secondary winding and its anode coupled to the input of said direct current amplifier, the threshold of said diode being under the control of said threshold control voltage, and a resistor and capacitor in parallel coupled between said diode anode and a fixed potential whereby, upon the occurrence of a high-amplitude intermediate frequency voltage in the primary of the transformer of said one of said intermediate frequency amplifiers greater than the amplitude of said threshold control voltage, the diode will conduct instantaneously to back bias said center tap of said secondary of said one intermediate frequency amplifier sufficiently to prevent saturation of the next forward intermediate frequency amplifiers of said plurality of intermediate frequency amplifiers.

6. An instantaneous automatic gain control circuit as set forth in claim 5 wherein said automatic back biasing network includes a pair of diodes in anode back-to-back relation with the cathode of one coupled through a capacitor to said sampling secondary and the cathode of the other coupled to the input of said direct current amplifier, the back-to-back coupling of said pair of diodes being coupled through a parallel resistance-capacitance network to a fixed potential, and an integrating network coupled to the input of said direct current amplifier, said pair of diodes being biased to said fixed potential whereby back bias voltage is developed at the input to said direct current amplifier for normal intermediate frequency voltage amplitude.

7. An instantaneous automatic gain control circuit as set forth in claim 6 wherein said threshold control voltage is a direct current voltage applied across the resistance element of a potentiometer, the adjustable tap of which is connected to one terminal lead of said sampling secondary winding and wherein one terminal of said direct current control voltage establishes said fixed potential.

8. An instantaneous automatic gain control circuit as set forth in claim 7 wherein said coupling of said diode in said instantaneous back-biasing network and the cathode of said other diode in said pair of diodes are coupled to said direct current amplifier through a cathode follower.

9. An instantaneous automatic gain control circuit of a radio frequency receiver having a plurality of intermediate frequency amplifier stages coupled by transformers the secondaries of which are center-tapped, comprising:
   a sampling secondary winding in flux relation with each intermediate frequency transformer;
   a threshold direct current voltage source coupled across the resistance of a potentiometer, the adjustable tap thereof being connected to one terminal lead of one of said sampling secondary windings to adjust the threshold direct current voltage therein;
   a direct current amplifier having an input and having an output coupled to the center tap of one of said intermediate frequency transformer secondaries in flux relation with said one of said sampling secondary windings;
   a back bias selective filter network coupled between the other terminal lead of said one sampling secondary winding and the input of said direct current amplifier to produce a back-biasing voltage at said center tap equal in amplitude to the amplitude of said intermediate frequency; and
   an instantaneous back-biasing network including a diode having its cathode directly connected to said other terminal lead of said one sampling secondary winding and its anode coupled to said input to said direct current amplifier, said diode cathode having a threshold voltage thereon established by said potentiometer whereby high amplitude signal voltages passing through said intermediate frequency amplifiers will produce an instantaneous back bias from one intermediate frequency amplifier stage to the next forward intermediate frequency amplifier stage to prevent saturation thereof.

10. An instantaneous automatic gain control circuit as set forth in claim 9 wherein said back bias selective filter includes a pair of diodes connected in anode back-to-back relation with the cathode of one capacitor coupled to said other terminal lead of said sampling secondary winding and the cathode of the other diode of said pair coupled through a parallel resistance-capacitor network to said direct current amplifier input, and said back-to-back connection of said pair of diodes is coupled in parallel through a resistance and capacitance to a fixed potential.

11. An instantaneous automatic gain control circuit as set forth in claim 10 wherein said input to said direct current amplifier is through a cathode follower.

* * * * *